United States Patent
Bereuter et al.

(10) Patent No.: US 11,767,931 B2
(45) Date of Patent: Sep. 26, 2023

(54) VACUUM VALVE FOR LOADING AND/OR UNLOADING A VACUUM CHAMBER

(71) Applicant: VAT Holding AG, Haag (CH)

(72) Inventors: René Bereuter, Wolfurt (AT); Stefan Schoch, Salez (CH); Philipp Wohlwend, Vaduz (LI)

(73) Assignee: Vat Holding AG, Haag (CH)

( * ) Notice: Subject to any disclaimer, the term of this patent is extended or adjusted under 35 U.S.C. 154(b) by 0 days.

(21) Appl. No.: 17/639,619

(22) PCT Filed: Aug. 6, 2020

(86) PCT No.: PCT/EP2020/072140
§ 371 (c)(1),
(2) Date: Mar. 2, 2022

(87) PCT Pub. No.: WO2021/043528
PCT Pub. Date: Mar. 11, 2021

(65) Prior Publication Data
US 2022/0290780 A1    Sep. 15, 2022

(30) Foreign Application Priority Data
Sep. 3, 2019  (DE) .......................... 102019123563.4

(51) Int. Cl.
*F16K 51/02*   (2006.01)
*F16K 3/314*   (2006.01)
(Continued)

(52) U.S. Cl.
CPC ................ *F16K 51/02* (2013.01); *F16K 3/18* (2013.01); *F16K 3/314* (2013.01); *F16K 37/0041* (2013.01)

(58) Field of Classification Search
CPC ...... F16K 51/02; F16K 3/314; F16K 37/0041; F16K 3/18
See application file for complete search history.

(56) References Cited

U.S. PATENT DOCUMENTS 4,052,036 A * 10/1977 Schertler ................. F16K 51/02
251/197
4,470,576 A *  9/1984 Schertler ................. F16K 51/02
251/193
(Continued)

FOREIGN PATENT DOCUMENTS

CN    101067463 A    11/2007
CN    101276729 A    10/2008
(Continued)

OTHER PUBLICATIONS

Search Report for corresonding Chinese Patent Application No. 2020800616604 dated Apr. 25, 2023, 3 pages long.

*Primary Examiner* — David Colon-Morales
(74) *Attorney, Agent, or Firm* — Volpe Koenig

(57) ABSTRACT

A vacuum valve (1) for loading and/or unloading a vacuum chamber (2). The vacuum valve has a closure plate (3) that is pressed against a valve seat (4) when in a closed position to seal a loading opening (5) and being raised from the valve seat (4) when in an open position, exposing the loading opening (5) for loading and/or unloading the vacuum chamber (2). The vacuum valve has at least one drive (6) for moving the closure plate (3) back and forth between the open and closed positions, the closure plate (3) being held by at least one guide (7) on at least one plate holder (8) of the drive (6). The vacuum valve has at least one elastic preload body (9), with the closure plate (3) being movable against a preload of the elastic preload body (9) along the guide (7) relative to the plate holder (8).

16 Claims, 6 Drawing Sheets

(51) Int. Cl.
*F16K 37/00* (2006.01)
*F16K 3/18* (2006.01)

(56) References Cited

U.S. PATENT DOCUMENTS

| | | | | | |
|---|---|---|---|---|---|
| 4,480,659 | A | * | 11/1984 | Peacock | F16K 3/184 251/197 |
| 4,560,141 | A | * | 12/1985 | Bosch | F16K 3/182 251/169 |
| 5,026,995 | A | * | 6/1991 | Hazaki | F16K 3/186 250/442.11 |
| 5,101,861 | A | * | 4/1992 | Deville | F16K 39/04 251/197 |
| 5,566,922 | A | * | 10/1996 | Tanaka | F16K 3/188 251/157 |
| 6,390,449 | B1 | * | 5/2002 | Ishigaki | F16K 3/184 251/193 |
| 6,427,973 | B1 | * | 8/2002 | Wagner | F16K 3/188 251/193 |
| 6,612,546 | B2 | * | 9/2003 | Young | F16K 3/184 251/158 |
| 7,341,237 | B2 | * | 3/2008 | Bosch | F16K 51/02 251/204 |
| 7,611,122 | B2 | * | 11/2009 | Tichy | F16K 31/122 251/193 |
| 8,419,337 | B2 | * | 4/2013 | Tateshita | F16K 51/02 414/217 |
| 9,404,589 | B2 | * | 8/2016 | Ishigaki | F16K 31/12 |
| 9,599,233 | B2 | * | 3/2017 | Ishigaki | F16K 51/02 |
| 9,638,335 | B2 | * | 5/2017 | Huang | F16K 27/044 |
| 9,765,897 | B2 | * | 9/2017 | Jee | F16K 31/122 |
| 9,976,655 | B2 | * | 5/2018 | Ehrne | F16K 3/182 |
| 10,520,109 | B2 | * | 12/2019 | Hofer | F16K 51/02 |
| 10,738,895 | B2 | * | 8/2020 | Ehrne | F16K 51/02 |
| 11,035,488 | B2 | * | 6/2021 | Kozaki | F16K 41/10 |
| 11,209,092 | B2 | * | 12/2021 | Iwabuchi | F16K 1/303 |
| 11,255,464 | B2 | * | 2/2022 | Shimoda | F16K 31/1225 |
| 11,268,630 | B2 | * | 3/2022 | Hosek | F16K 3/10 |
| 2006/0169940 | A1 | * | 8/2006 | Mayer | F16K 41/10 251/301 |
| 2018/0023719 | A1 | * | 1/2018 | Nakamura | F16K 3/06 251/129.11 |
| 2018/0339816 | A1 | * | 11/2018 | Oldendorf | F16K 3/18 |
| 2020/0318235 | A1 | * | 10/2020 | Kollberg | C23C 16/4409 |

FOREIGN PATENT DOCUMENTS

| | | | |
|---|---|---|---|
| CN | 101629650 A | | 1/2010 |
| CN | 104930198 A | | 9/2015 |
| CN | 105020423 A | | 11/2015 |
| CN | 205207878 | | 5/2016 |
| CN | 205207878 U | * | 5/2016 |
| CN | 107575641 A | | 1/2018 |
| CN | 109392303 A | * | 2/2019 ... F16K 3/18 |
| DE | 102005043595 | | 4/2007 |
| DE | 102015106061 | | 10/2016 |
| DE | 102017123231 | | 4/2019 |
| EP | 1762759 A2 | | 3/2007 |
| JP | H10159999 | | 6/1998 |
| JP | H10159999 A | * | 6/1998 |
| KR | 20190074175 A | * | 6/2019 |

* cited by examiner

VACUUM VALVE FOR LOADING AND/OR UNLOADING A VACUUM CHAMBER

TECHNICAL FIELD

The present invention relates to a vacuum valve for loading and/or unloading of a vacuum chamber, wherein the vacuum valve has a closure plate, wherein the closure plate, in a closed position, is pushed against a valve seat and closes off a loading opening and, in an open position, is lifted off from the valve seat and opens up the loading opening for loading and/or unloading of the vacuum chamber, wherein the vacuum valve has at least one drive for movement of the closure plate back and/or forth between the open position and the closed position.

BACKGROUND

A large number of embodiments of vacuum valves are known in the prior art. Said vacuum valves serve for closing off vacuum or process chambers at one side in such a way that, in the closed state, there is provided in the vacuum or process chamber an enclosed volume in which processes can be carried out under predefinable negative-pressure conditions and possibly also in a specially generated atmosphere. Generic vacuum valves can be suitable for loading and/or unloading the vacuum chamber manually, that is to say by hand or by way of a hand-guided tool. That is to say that, in the open position of the closure plate of the vacuum valve, an operator can put objects into the vacuum chamber by hand and/or can also remove objects from the vacuum chamber by hand. For this purpose, the operator must be able to reach with a hand or a whole arm or at least with a hand-guided tool into the vacuum chamber through the open vacuum valve. Generic vacuum valves may however also be provided for mechanical loading and/or unloading of the vacuum chamber, for example by means of robots.

SUMMARY

It is an object of the invention to improve the operating safety of generic vacuum valves for loading and/or unloading of a vacuum chamber.

For this purpose, the invention proposes that the closure plate is held against at least one plate holder of the drive by means of at least one guide and the vacuum valve has at least one elastic preload body, wherein the closure plate is movable relative to the plate holder along the guide counter to a preload of the elastic preload body.

The invention thus makes provision for the closure plate to be fastened movably to the plate holder of the drive such that the closure plate can be moved relative to the plate holder along the guide counter to the preload of the elastic preload body. If, during movement of the closure plate in the direction toward the closed position, a hand or an arm or a hand-guided tool of the operator or another object, for example a loading and/or unloading robot, is inadvertently still situated in the loading opening and collides with the closure plate, the invention makes it possible for the closure plate to stop even though the drive is moved further in the direction of the closed position. This provides a safety measure by way of which it is possible to avoid a situation in which the body parts of a person, for example their hand, arm or the like, that are still situated in the loading opening or objects which are still situated there, such as for example a loading and/or unloading robot, is or are crushed or injured or damaged. Damage to the closure plate or other parts of the vacuum valve can also be avoided in this way. Vacuum valves according to the invention may be vacuum valves for manual loading and/or unloading of the vacuum chamber that are suitable for carrying-out of the loading and/or unloading process by hand or by way of a hand-guided tool. They may however also be vacuum valves which are intended for carrying-out of the loading and/or unloading process mechanically, for example by means of a loading and/or unloading robot.

The vacuum valve according to the invention could also be referred to as vacuum closure device. It is at any rate a valve, or a closure device, that can be used in so-called vacuum technology. Reference is normally made to vacuum technology if operating states with pressures of less than or equal to 0.001 mbar (millibars) or 0.1 pascals are attained. Vacuum valves are valves which are designed for these pressure ranges and/or corresponding pressure differences with respect to the surroundings. Reference may also be generally made to vacuum valves, however, if they are designed for pressures below normal pressure, that is to say below 1 bar.

In particular so as to be able to serve for manual loading and/or unloading of a vacuum chamber, the loading openings to be closed preferably have a size of 800 $cm^2$ to 4800 $cm^2$, preferably of 1000 $cm^2$ to 1400 $cm^2$. The closure plates, provided for closing off such loading openings, of corresponding vacuum valves thus likewise expediently have at least these sizes.

In preferred embodiments, it is provided that the valve seat and/or the loading opening are/is formed as part of the vacuum valve according to the invention. For example, the valve seat may be formed on a valve housing of the vacuum valve according to the invention. The loading opening may be a corresponding opening, preferably surrounded by the valve seat, in the valve housing of the vacuum valve according to the invention. It is not absolutely necessary to make provision for this in this way, however. Alternatives to this are also conceivable. For example, it is possible for the valve seat and/or the loading opening to be formed as part of a vacuum or process chamber. Such loading openings, too, can be closed off by way of the closure plate of vacuum valves according to the invention when the closure plate is correspondingly pushed against the valve seat.

Vacuum valves according to the invention may have a single drive, but also multiple drives, for movement of the closure plate back and/or forth between the open position and the closed position. Vacuum valves according to the invention may be so-called mono vacuum valves, in the case of which the closure plate is moved back and forth between the open position and the closed position only linearly along a single, preferably straight, movement path. Vacuum valves according to the invention may however also be so-called L-type vacuum valves, in the case of which the closure plate is moved back and forth between open position and closed position on a first movement path and subsequently on at least one second movement path, wherein these two movement paths are at an angle to one another, preferably orthogonal to one another. In the case of such L-type vacuum valves, the invention may also make provision for the closure plate, starting from the open position, to be moved firstly into an intermediate position in a preferably linear direction on a first movement path, in which intermediate position the closure plate has already been brought into alignment with the loading opening but does not yet bear against the valve seat. The closure plate is then brought into the closed position from said intermediate position on the second movement path, in which closed position said closure plate then actually bears against the valve seat in a sealing manner. The opening, that is to say the movement into the open position from the closed position, is then realized in a correspondingly reversed manner along the two movement paths. In particular in the case of vacuum valves according to the invention for which the closure plate performs an L-shaped movement between the open position and the closed position, provision may be made of two drives, wherein the first drive moves the closure plate along the first movement path and the second, or further, drive then moves the closure plate along the second, or further, movement path. Fundamentally, it should be pointed out, however, that a single drive is also possible for such L-type vacuum valves, as is known per se in the prior art.

In preferred embodiments of the invention, the drive(s) is/are a linear drive. The guide along which the closure plate is movable relative to the plate holder counter to the preload of the elastic preload body is expediently a linear guide. Thus, it is expediently also provided that the closure plate is displaceable relative to the plate holder along the guide counter to the preload of the elastic preload body. The guide may be arranged parallel to a closure plane, wherein, in the closed position, the closure plate bears against the valve seat in said closure plane. The closure plane is thus generally defined by that surface of the valve seat against which the closure plate bears in the closed position. The expression "guide arranged parallel to the closure plane" means that, on its way along the guide, the closure plate is moved relative to the plate holder in a direction parallel to the closure plane. The guide may at any rate be of very different form in different variants known per se in the prior art. Rail guides or slot guides may be involved. Elongate holes, for example in the closure plate or in the plate holder, may equally well be involved, wherein corresponding guide pegs are guided in said elongate holes. The guide pegs may then thus be fastened to the respective counterpart as well as to the closure plate or to the plate holder.

It is expediently provided that the closure plate is able to be moved by the drive along a movement path during movement of the closure plate back and/or forth between the open position and the closed position, and the guide is arranged parallel to the movement path of the closure plate. As already explained in the introduction, said movement path may be the single movement path between open position and closed position, but may also be one of multiple movement paths between open position and closed position. The fact that the guide is arranged parallel to the movement path of the closure plate means in turn that, in the event of movement along the guide, the closure plate is moved in a direction parallel to the movement path of the closure plate on which the closure plate is moved by the drive.

At any rate, it is the case that the invention makes it possible for the closure plate to be moved relative to the plate holder, and thus also relative to the drive, along the guide counter to the preload of the elastic preload body. In order to also be able to detect this relative movement, preferred variants of the invention provide that the vacuum valve has a detector for detecting a movement of the closure plate relative to the plate holder along the guide counter to the preload of the elastic preload body. The detector may have very different designs for this purpose. Use may be made in this case of a wide variety of detectors which can be used here and which are known per se in the prior art. As long as the closure plate is moved along with the drive, it is possible by way of the detector for example to detect that a normal operating state prevails. If a person, for example with a hand or an arm or a hand-guided tool, or an object, such as for example a loading and/or unloading robot, then inadvertently collides with the closure plate, then there occurs a movement of the closure plate relative to the plate holder, and thus also relative to the drive, along the guide counter to the preload of the elastic preload body, which can be detected by the detector. The detector may have for example a first detector element, which is fixed to the closure plate. It may furthermore have at least one second detector element, which is fixed to the plate holder. In these embodiments, a relative movement between the two detector elements occurs whenever the closure plate is moved relative to the plate holder. The detector elements may for example be magnetic sensors, electrical sensors, light sensors or the like. All this is known in numerous embodiments in the prior art. The detector may also be referred to as switch, which switches whenever the closure plate and the plate holder, or the two detector elements, are moved relative to one another.

Vacuum valves according to the invention expediently have a regulating device, wherein said regulating device actuates the at least one drive, or the multiple drives, for movement of the closure plate back and/or forth between open position and closing position. The regulating device preferably does this in a manner dependent on a signal of the detector. Here, it is preferably provided that, as long as the detector does not detect a relative movement between closure plate and plate holder along the guide counter to the preload of the elastic preload body, the drives are actuated by the regulating device for back-and-forth movement of the closure plate in a manner predefined by other operating parameters or operational commands. If, however, the detector detects a relative movement between closure plate and plate holder along the guide counter to the preload of the elastic preload body, then this is then expediently taken into account by the regulating device. For example, it may be provided that the regulating device stops the at least one drive for movement of the closure plate back and/or forth if the signal of the detector indicates a movement of the closure plate relative to the plate holder along the guide counter to the preload of the elastic preload body. In this way, a type of emergency stop is realized if the detector detects that closure plate and plate holder are moving relative to one another, which suggests that the closure plate has collided with an object or a person or their hand or arm. It goes without saying that other control commands may also be triggered at the regulating device if the signal of the detector indicates a movement of the closure plate relative to the plate holder along the guide counter to the preload of the elastic preload body. In this case, it may also be provided for example that the regulating device actuates the drive in such a way that the direction of movement of the closure plate is reversed.

A method according to the invention for operating a vacuum valve according to the invention expediently provides that, during movement of the closure plate in the direction toward the closed position, the closure plate is moved relative to the plate holder along the guide counter to the preload of the elastic preload body if an object or a person collides with the closure plate. In the case of methods according to the invention, this collision can then in turn be detected by a corresponding detector. The corresponding signal of the detector can then in turn be used by the regulating device already mentioned to stop the drive for movement of the closure plate back and forth or to reverse the direction of movement thereof, etc.

BRIEF DESCRIPTION OF THE DRAWINGS

Further features and details of preferred variants of the invention will be explained below by way of example with reference to an embodiment variant of the invention. In the figures.

DETAILED DESCRIPTION

Figure 1:
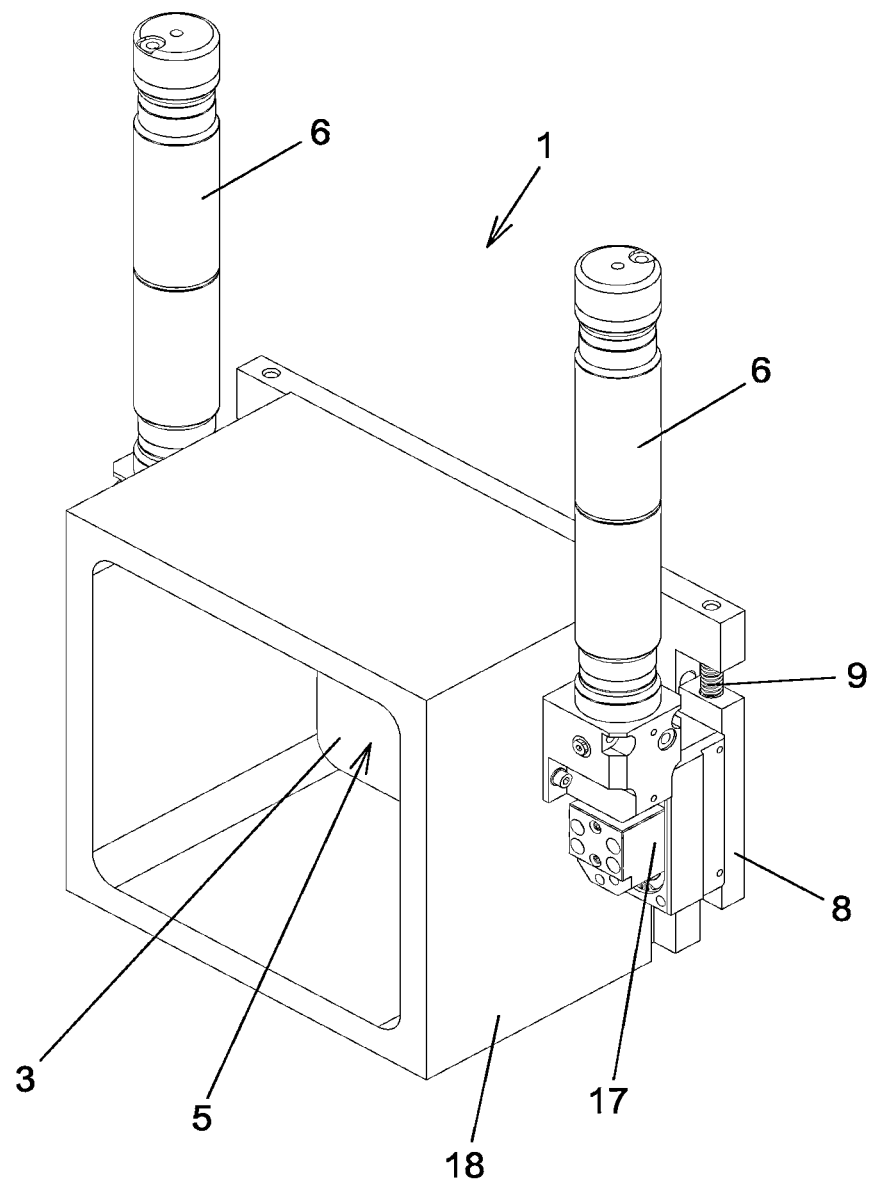
FIG. 1 shows a view obliquely from the rear of an exemplary embodiment of a vacuum valve according to the invention in the closed position
Figure 2:
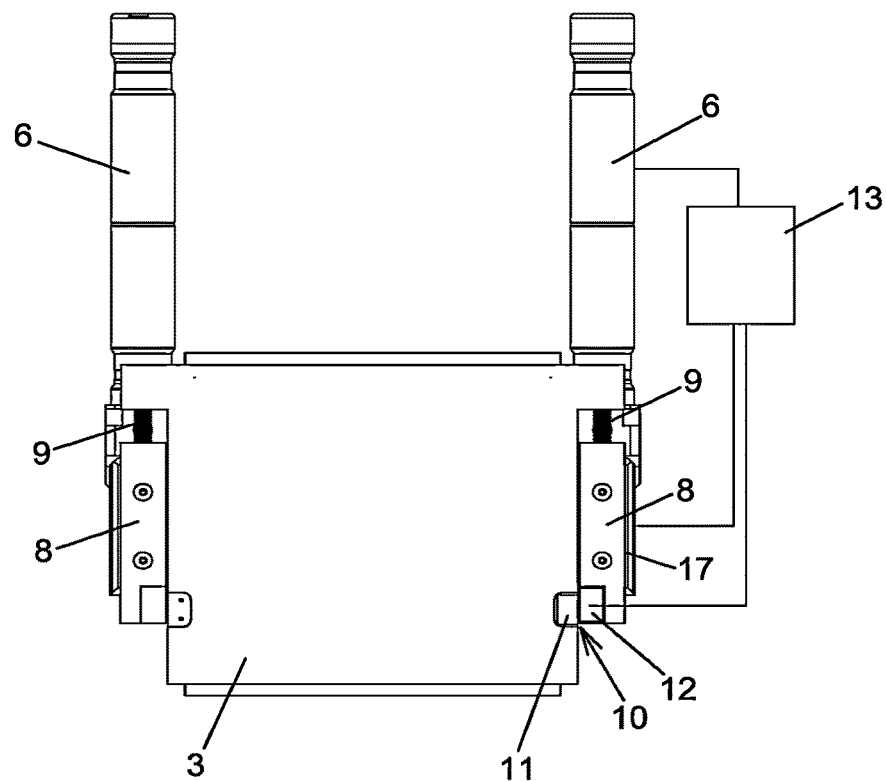
FIG. 2 shows a view from the front of said vacuum valve in the closed position
Figure 3:
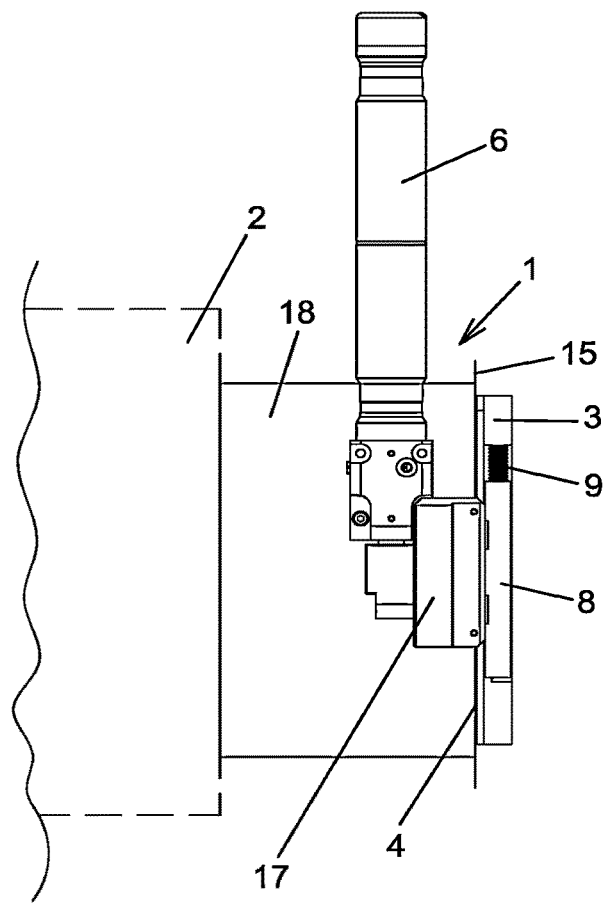
FIG. 3 shows a side view of the vacuum valve in the closed position
Figure 4:
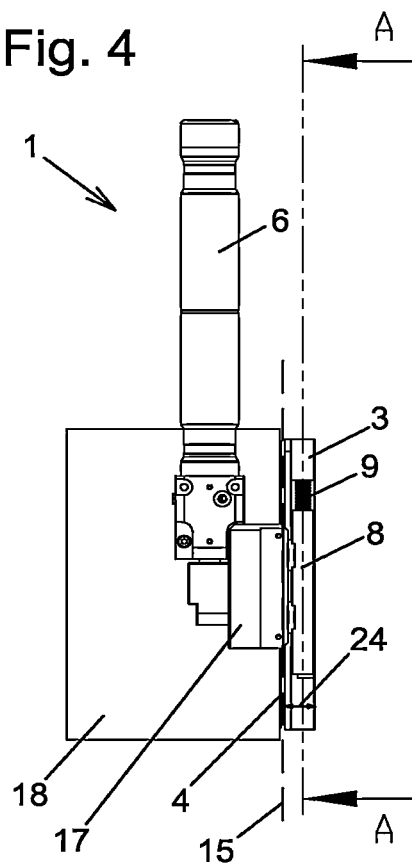
FIG. 4 shows a side view of the vacuum valve in an intermediate position
Figure 6:
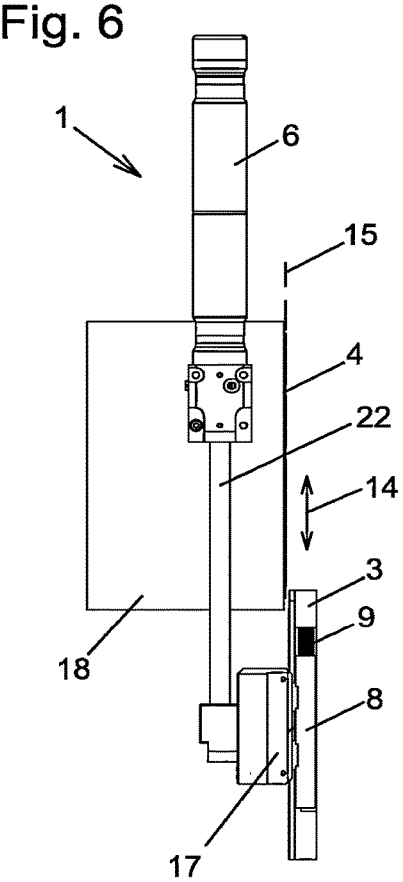
FIG. 6 shows the vacuum valve in the open position in a side view
Figure 7:
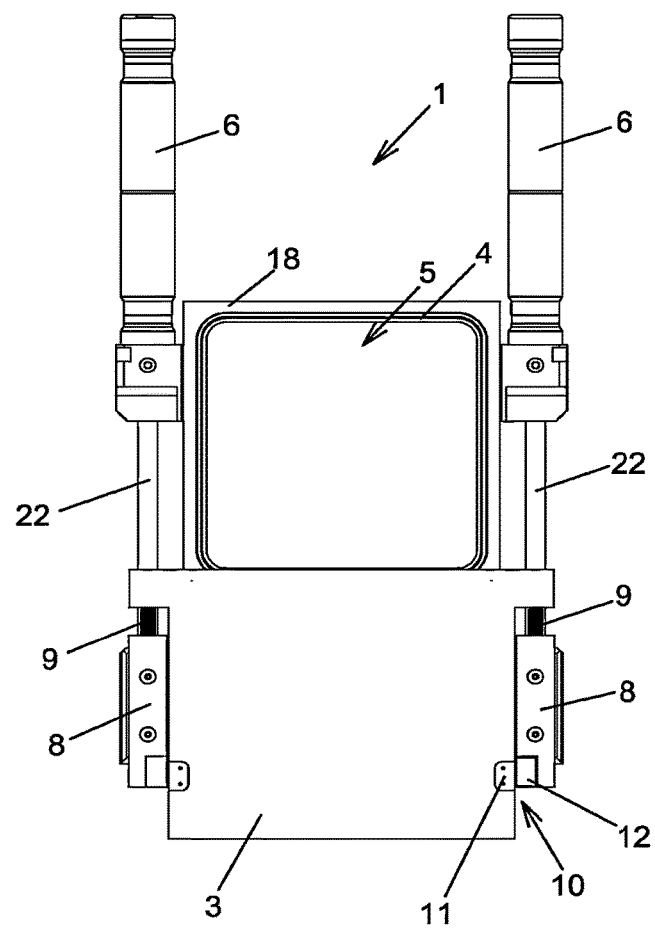
FIG. 7 shows the vacuum valve in the open position in a front view

The exemplary embodiments according to the invention of a vacuum valve 1 that are shown in the figures involve a so-called L-type valve, in the case of which the closure plate 3 is moved from the open position shown in FIGS. 6 and 7 into the intermediate position shown in FIG. 4 along a first movement path 14, and then into the closed position shown in FIGS. 1 to 3 along a second movement path 24. The closure plate 3 is moved from the closed position into the open position, in a correspondingly reversed manner, firstly into the intermediate position along the second movement path 24, and from there into the open position along the first movement path 14. In the exemplary embodiment shown here, the movement paths 14 and 24 are arranged orthogonally to one another. For each movement path, a separate drive is provided here. Here, in the exemplary embodiment shown, these drives are in each case formed in pairs. The two drives 6 serve for movement of the closure plate between the open position as per FIGS. 6 and 7 and the intermediate position as per FIG. 4 along the first movement path 14. The further drives 17, which are likewise formed as a pair, serve for movement of the closure plate 3 between the intermediate position as per FIG. 4 and the closed position as per FIGS. 1 to 3. Here, all the drives 6 and 17 are in the form of linear drives. They may be electrical, pneumatic, hydraulic or other linear drives. The drives 6 of this exemplary embodiment each have a piston rod 22 which in each case carries one of the further drives 17. The respective plate holder 8 is in each case fastened to one of the further drives 17. Said drives are known per se and do not need to be explained further. In this exemplary embodiment, the plate holders 8 are fastened to the drives 6 and 17, in each case in the manner indicated, such that the plate holders 8 are always moved along with the drives 6 and 17. On the plate holders 8, correspondingly provided in duplicate here in this exemplary embodiment, of the respective drive 6 or 17, the closure plate 3 is, according to the invention, movable relative to the respective plate holder 8 along the guides 7 (which are explained further below) counter to the preload of the elastic preload body 9, which is likewise provided in duplicate here.

The valve seat 4, against which the closure plate 3 bears in the closed position as per FIGS. 1 to 3, is, in the exemplary embodiment shown here, part of the vacuum valve 1 according to the invention, in that said valve seat is formed on the valve housing 18 of the vacuum valve 1. The valve seat 4 surrounds the loading opening 5, which is closed off by means of the closure plate 3 in the closed position. In the exemplary embodiment shown, the loading opening 5 is likewise part of the vacuum valve 1 according to the invention, in that said loading opening is formed in the valve housing 18. The loading opening 5 is the opening through which objects can be introduced manually and/or mechanically into the vacuum chamber 2, and/or removed manually and/or mechanically from the vacuum chamber 2, when the vacuum valve 1 is open. For this purpose, the respective person reaches with a hand or an arm or a tool held by a hand, or for example a loading and/or unloading robot reaches, into the vacuum chamber 2 through the loading opening 5. The vacuum chamber 2 is illustrated schematically in FIG. 3. In the exemplary embodiment shown here, it is situated on that side of the valve housing 18 which is opposite the closure plate 3. The vacuum chamber 2 is known per se and therefore, apart from in FIG. 3, is not illustrated.

It has already been explained in the introduction that it is not absolutely necessary for the valve seat 4 and the loading opening 5 to be part of the vacuum valve 1 itself. They may, for example, also be formed directly as parts of the vacuum chamber 2.

Figure 5:
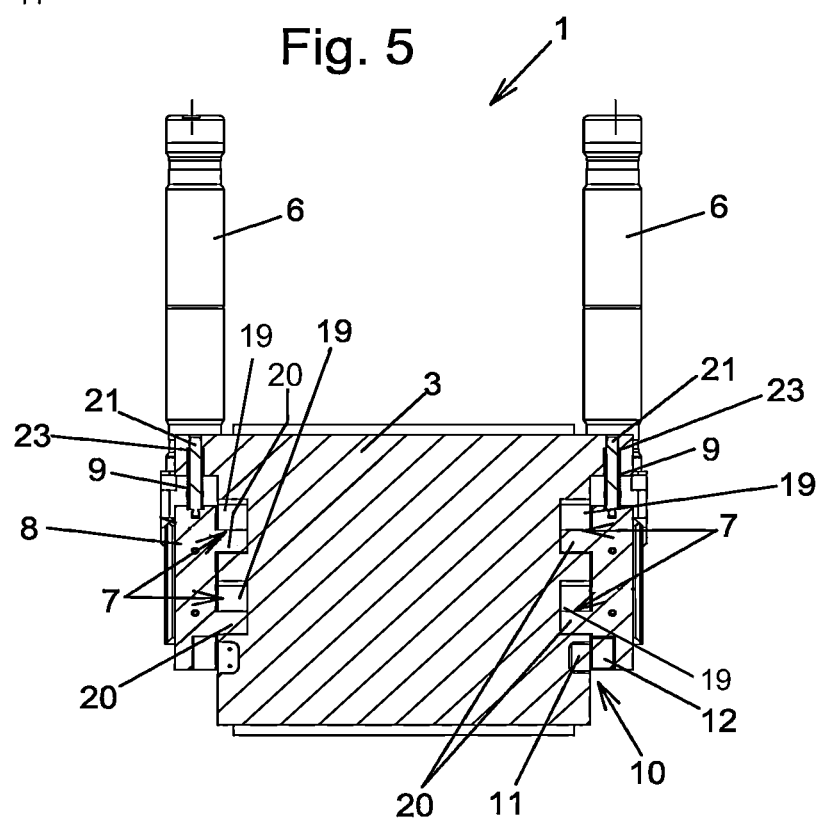
FIG. 5 shows the section along the section line AA from FIG. 4
Figure 9:
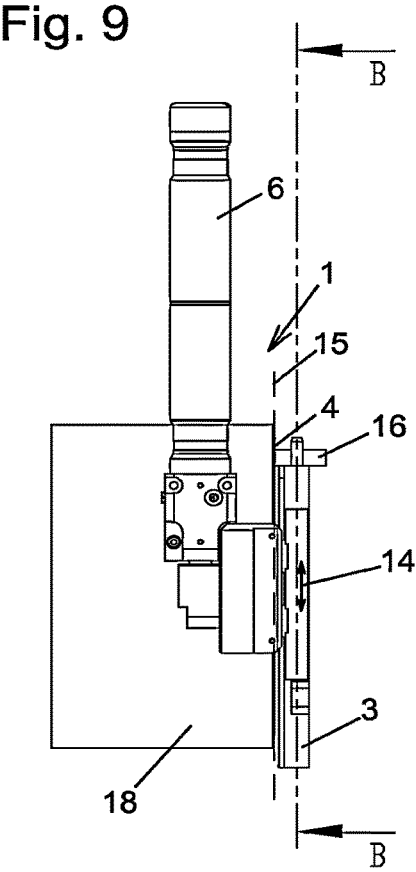
FIG. 9 shows a side view with respect to the state as per FIG. 8; an FIG. 10 shows the section along the section line BB in FIG. 9.
Figure 10:
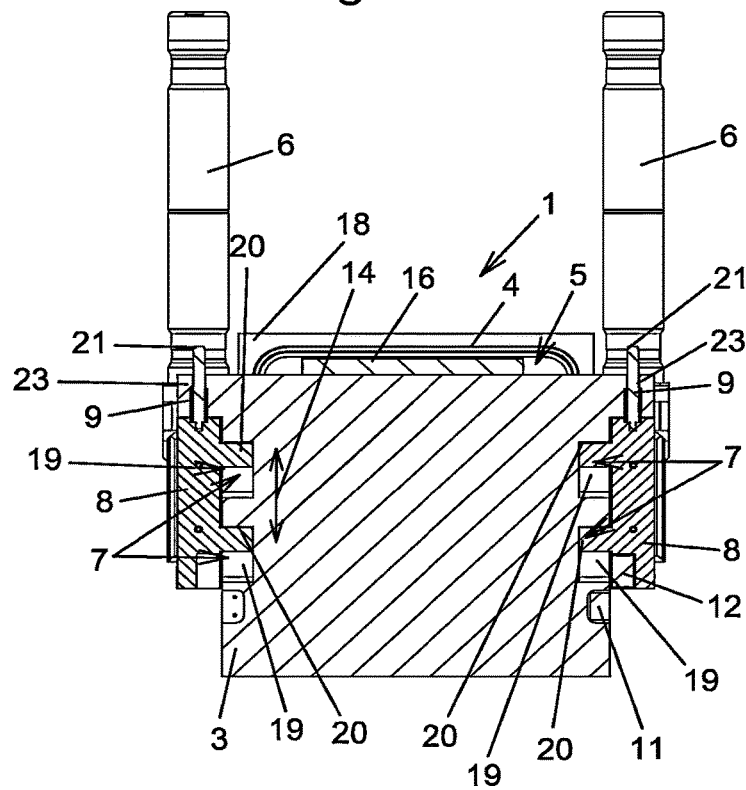

The guides 7, which are likewise provided multiply in this exemplary embodiment and along which the closure plate 3 is movable or displaceable relative to the plate holder 8 counter to the preload of the elastic preload body 9, are, in the variant shown here, realized within the closure plate 3. As FIGS. 5 and 10 show in the longitudinal sections along the section lines AA from FIG. 4 and BB from FIG. 9, the guides 7 are, in this exemplary embodiment, elongate holes 19 in the closure plate 3 in which guide pegs 20 are guided. In this exemplary embodiment, the guide pegs 20 are in each case fastened in a fixed manner to one of the plate holders 8. In the event of relative movement between closure plate 3 and plate holder 8, the closure plate 3 is displaced by way of its elongate holes 19 along the guide pegs 20, which leads to corresponding guidance of the closure plate 3 on the plate holders 8. It goes without saying that it would also be possible to realize other guides 7 for mounting the closure plate 3 in a manner movable or displaceable relative to the plate holders 8. These may for example be rail guides, other guide slots and the like.

For the purpose of preloading the closure plate 3 relative to the plate holders 8, preload bodies 9 are provided on both sides in this exemplary embodiment, which preload bodies are in the form of helical springs here. Said preload bodies 9 are guided by means of pins 21. One end of the preload body 9 lies in each case against a shoulder 23 of the closure plate 3. The in each case opposite end of the preload body 9 lies on the respective plate holder 8. In the unloaded initial or normal position, the preload bodies 9 push the closure plate 3 into that position relative to the respective plate holder 8 which is illustrated in FIG. 5. For the sake of completeness, it is pointed out that the preload between closure plate 3 and plate holders 8 may of course also be realized by way of differently formed and differently arranged elastic preload bodies.

In this exemplary embodiment, the guides 7 are arranged parallel to that movement path 14 of the closure plate 3 on which the closure plate 3 is moved by the drive 6 back and forth between the open position as per FIGS. 6 and 7 and the intermediate position as per FIGS. 4 and 5. In this exemplary embodiment, however, the guides 7 are also arranged parallel to the closure plane 15, which is drawn in FIGS. 3, 4, 6 and 9. The closure plane 15 is predefined by the valve seat 4. This is the plane in which the closure plate 3 bears against the valve seat 4 in the closed position.

In the variant of the invention shown here, there is also provided a detector 10 for detecting a movement of the closure plate 3 relative to the plate holder 8 along the guide 7 counter to the preload of the elastic preload body 9. In the exemplary embodiment shown, said detector 10 has a first detector element 11, which is fixed to the closure plate 3. It furthermore has a second detector element 12, which is fixed to the plate holder 8. If relative movement between closure plate 3 and plate holder 8 occurs, then, by necessity, relative movement between first and second detector elements 11 and 12 also occurs. In this way, the detector 10 can detect whether the closure plate 3 and the plate holder 8 have been moved relative to one another along the guide 7 or whether plate holder 8 and closure plate 3 are still in the initial or normal position, shown in FIGS. 1 to 7, relative to one another. The detector 10 can, as already explained in the introduction, work with a wide variety of physical measurement variables. Electrical, mechanical, magnetic, optical or other detectors may be involved. All of this is known per se and does not need to be explained further.

FIG. 2 schematically illustrates a regulating device 13 which is known per se, which regulating device first of all serves for actuating the drive of the vacuum valve 1, that is to say the drives 6 and the further drives 17 in the specific exemplary embodiment here, for opening and closing the loading opening 5. Said regulating device 13 is, in this exemplary embodiment, now also connected to the detector 10 such that, when the drives 6 and 17 are actuated, the regulating device 13 can take into account a signal of the detector 10, or in other words can actuate the drives 6 for movement of the closure plate 3 back and/or forth in a manner dependent on the signal of the detector 10. This makes it possible for the regulating device 13 to stop the drive 6 for movement of the closure plate 3 back and/or forth, or to reverse the direction of movement thereof, if the detector 10 detects a relative movement between closure plate 3 and plate holder 8, that is to say the signal of the detector 10 indicates a movement of the closure plate 3 relative to the plate holder 8 along the guide 7 counter to the preload of the elastic preload body 9.

Figure 8:
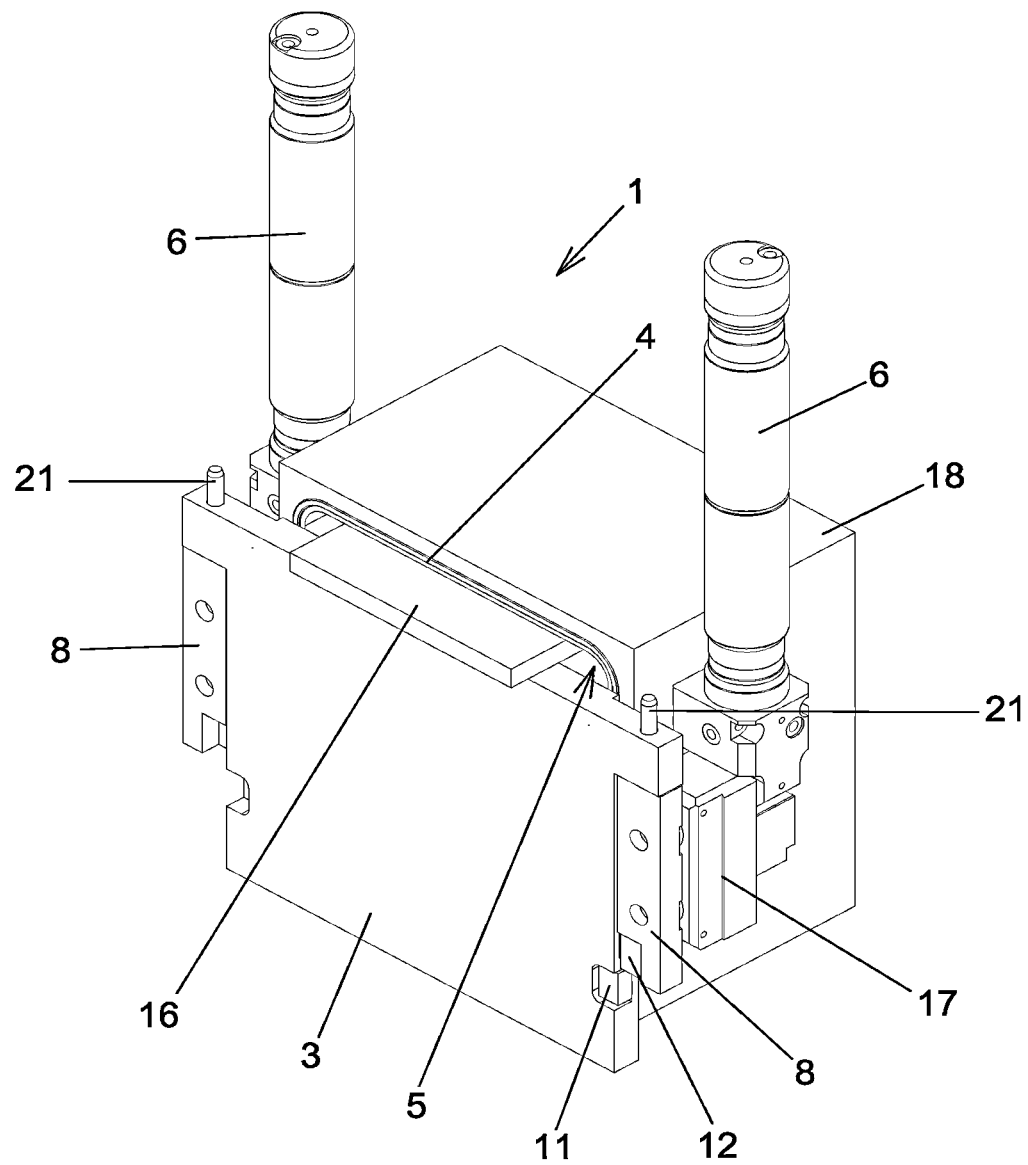
FIG. 8 shows a perspective view from the front of the vacuum valve with a jammed object

The latter case occurs, especially during movement of the closure plate 3 in the direction toward the closed position, if, generally inadvertently, an object 16, such as for example a loading and/or unloading robot, or a hand or an arm of a person is still situated in the loading opening 5. This scenario is shown in FIGS. 8 to 10 using by way of example the object 16, which, while the closure plate 3 is moved in the direction of the closed position, is still situated in the loading opening 5. Instead of the object 16, this could also be a hand or an arm or another body part of a person or a hand-guided tool. If this results in a collision between the object 16 or the person and the closure plate 3, then the closure plate 3 is stopped due to said collision while, in this exemplary embodiment, the drives 6 and thus also the plate holders 8 connected in a fixed manner thereto are moved further in the direction of the closed position. This results in compression of the preload bodies 9 and in a movement or displacement of the closure plate 3 relative to the plate holders 8 along the guides 7 counter to the preload of the preload bodies 9. In this way, it is then necessarily also the case that the first detector element 11 and the second detector element 12 are displaced relative to one another, as can be seen from the comparison of FIGS. 8 to 10, on the one hand, and FIGS. 1 to 7, on the other hand. As soon as the detector 10 detects in this manner a relative movement between closure plate 3 and plate holder 8, it sends a signal to the regulating device 13, which accordingly stops the drive 6 or reverses the direction of movement of the latter, so that no injuries or other impairments to the object 16 or the person trapped there can occur. In this way, the operating safety of vacuum valves 1 serving for manual and/or mechanical loading and/or unloading of a vacuum chamber 2 is increased significantly.

If the object 16 or the corresponding body part of the person is then removed from the loading opening 5, then the preload bodies 9 push the closure plate 3 and the plate holders 8 back into their initial or normal position, as per FIGS. 1 to 7, relative to one another, so that the vacuum valve 1 can then be used again in the known manner for opening up and also closing off the loading opening 5.

Generally, the vacuum valve 1 according to the invention is configured especially such that it is able to react to jamming of an object 16 or of a corresponding body part of a person during a closing process. It would also be conceivable, however, for vacuum valves 1 according to the invention to be configured in such a way that they are able to realize this safety function only during an opening process or both during an opening process and during a closing process. It should especially be pointed out that vacuum valves 1 according to the invention may also be configured as so-called mono vacuum valves, in the case of which the closure plate 3 is moved back and forth between open position and closed position only linearly in one direction of movement, such as in this case, for example, in the direction of the movement path 14. For this purpose, it would be necessary merely to correspondingly adapt the shape of the valve seat 4 and of the closure plate 3, this being known per se in the prior art.

LEGEND FOR THE REFERENCE SIGNS

1 Vacuum valve
2 Vacuum chamber
3 Closure plate
4 Valve seat
5 Loading opening
6 Drive
7 Guide
8 Plate holder
9 Preload body
10 Detector
11 First detector element
12 Second detector element
13 Regulating device
14 Movement path
15 Closure plane
16 Object
17 Further drive
18 Valve housing
19 Elongate hole
20 Guide peg
21 Pin
22 Piston rod
23 Shoulder
24 Second movement path

The invention claimed is:

1. A vacuum valve for loading and/or unloading of a vacuum chamber, the vacuum valve comprising:
    a closure plate that, in a closed position, is pushed against a valve seat and closes off a loading opening and, in an open position, is lifted off from the valve seat and opens up the loading opening for loading and/or unloading of the vacuum chamber;
    at least one drive configured to move the closure plate at least one of back or forth between the open position and the closed position, the drive including at least one plate holder, the closure plate is held against the at least one plate holder of the drive by at least one guide;
    at least one elastic preload body, wherein the closure plate is movable relative to the plate holder along the guide counter to a preload of the elastic preload body; and
    a detector for detecting a movement of the closure plate relative to the plate holder along the guide counter to the preload of the elastic preload body.

2. The vacuum valve as claimed in claim 1, wherein the detector has a first detector element which is fixed to the closure plate, and at least one second detector element, which is fixed to the plate holder.

3. The vacuum valve as claimed in claim 1, further comprising a regulating device configured to actuate the at least one drive for movement of the closure plate at least one of back or forth in dependence on a signal of the detector.

4. The vacuum valve as claimed in claim 3, wherein the regulating device is configured to stop the at least one drive for movement of the closure plate at least one of back or forth if the signal of the detector indicates a movement of the closure plate relative to the plate holder along the guide counter to the preload of the elastic preload body.

5. The vacuum valve as claimed in claim 1, wherein the closure plate is movable by the drive along a movement path during movement of the closure plate at least one of back or forth between the open position and the closed position, and the guide is arranged parallel to the movement path of the closure plate.

6. The vacuum valve as claimed in claim 1, wherein, in the closed position, the closure plate bears against the valve seat in a closure plane, and the guide is arranged parallel to the closure plane.

7. The vacuum valve as claimed in claim 1, wherein at least one of the valve seat or the loading opening is formed as part of the vacuum valve.

8. The vacuum valve as claimed in claim 1, wherein the drive is a linear drive.

9. A method for operating the vacuum valve as claimed in claim 1, the method comprising, during movement of the closure plate in the direction toward the closed position, moving the closure plate relative to the plate holder along the guide counter to the preload of the elastic preload body if an object or a person collides with the closure plate.

10. The vacuum valve as claimed in claim 1, wherein the guide is a linear guide.

11. The vacuum valve as claimed in claim 1, wherein the closure plate is linearly shiftable relative to the plate holder along the guide counter to the preload of the elastic preload body.

12. A vacuum valve for loading and/or unloading of a vacuum chamber, the vacuum valve comprising:
    a closure plate that, in a closed position, is pushed against a valve seat and closes off a loading opening and, in an open position, is lifted off from the valve seat and opens up the loading opening for loading and/or unloading of the vacuum chamber;
    at least one drive configured to move the closure plate at least one of back or forth between the open position and the closed position, the drive including at least one plate holder, the closure plate is held against the at least one plate holder of the drive by at least one guide; and
    at least one elastic preload body, wherein the closure plate is movable relative to the plate holder along the guide counter to a preload of the elastic preload body;
    wherein the closure plate is movable by the drive along a movement path during movement of the closure plate at least one of back or forth between the open position and the closed position, and the guide is arranged parallel to the movement path of the closure plate.

13. The vacuum valve as claimed in claim 12, wherein, in the closed position, the closure plate bears against the valve seat in a closure plane, and the guide is arranged parallel to the closure plane.

14. The vacuum valve as claimed in claim 12, wherein at least one of the valve seat or the loading opening is formed as part of the vacuum valve.

15. The vacuum valve as claimed in claim 12, wherein the drive is a linear drive.

16. A method for operating a vacuum valve for loading and/or unloading of a vacuum chamber, the vacuum valve including a closure plate that, in a closed position, is pushed against a valve seat and closes off a loading opening and, in an open position, is lifted off from the valve seat and opens up the loading opening for loading and/or unloading of the vacuum chamber; at least one drive configured to move the closure plate at least one of back or forth between the open position and the closed position, the drive including at least one plate holder; the closure plate is held against the at least one plate holder of the drive by at least one guide; and at least one elastic preload body, wherein the closure plate is movable relative to the plate holder along the guide counter to a preload of the elastic preload body, the method comprising:
    during movement of the closure plate in the direction toward the closed position, moving the closure plate relative to the plate holder along the guide counter to the preload of the elastic preload body if an object or a person collides with the closure plate.

* * * * *